Figure 1:
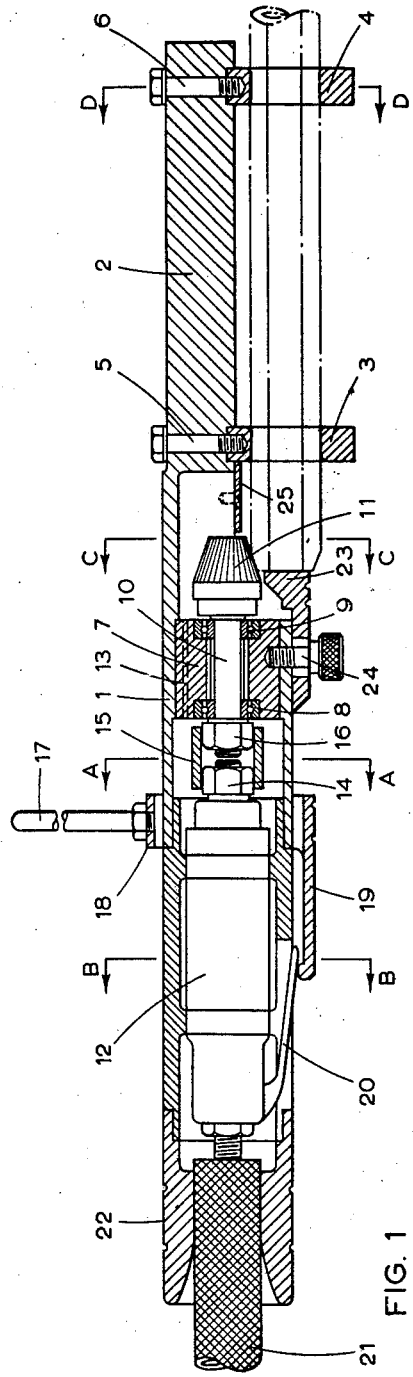

May 5, 1964

G. C. MACFARLANE ETAL 3,131,599

PORTABLE POWER OPERATED CHAMFERING TOOL

Filed Dec. 8, 1960

3 Sheets-Sheet 1

INVENTORS:
GEORGE CULLEN MACFARLANE
KENNETH DELLARD THIRSK
By
Richardson David and Nordon
ATTYS.

May 5, 1964  G. C. MACFARLANE ETAL  3,131,599
PORTABLE POWER OPERATED CHAMFERING TOOL
Filed Dec. 8, 1960  3 Sheets-Sheet 2

INVENTORS:
GEORGE CULLEN MACFARLANE
KENNETH BELLARD THIRSK
By
Richardson, David and Nerdon
ATTY'S.

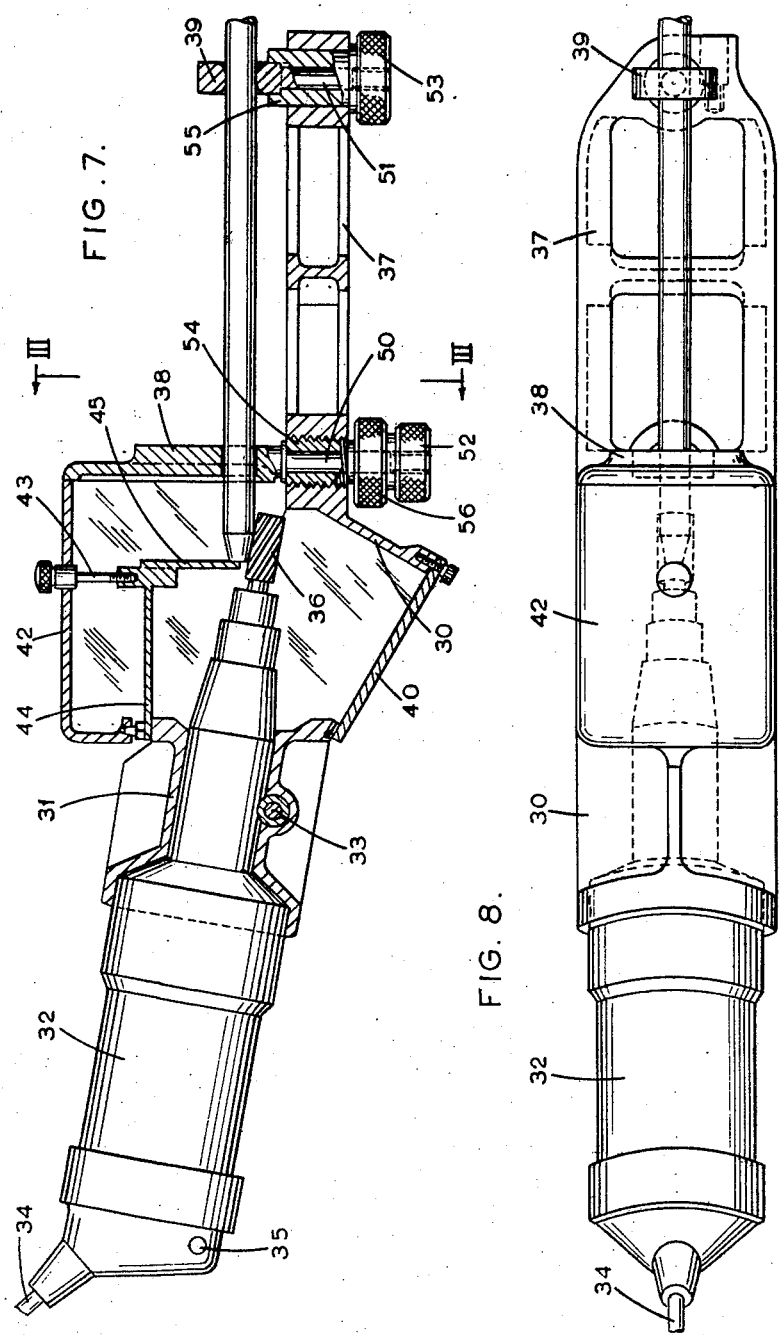

United States Patent Office 3,131,599
Patented May 5, 1964

3,131,599
PORTABLE POWER OPERATED
CHAMFERING TOOL
George Cullen Macfarlane, Trevors Wood, Swanland, East Yorkshire, England, and Kenneth Bellard Thirsk, 3 Elverley Drive, Westella, East Yorkshire, England
Filed Dec. 8, 1960, Ser. No. 74,678
Claims priority, application Great Britain Jan. 8, 1960
10 Claims. (Cl. 90—12)

This invention relates to power tools and has for its object to provide such a tool for chamfering or tapering the ends of bars, rods and tubes, which are for example to be fed to automatic machines.

Bar stock or tubular stock which is to be fed to automatic machines, such as screw machines, has terminal end faces which extend transversely thereof to define end edges. These end edges are usually rough or irregular and require bevelling before the stock is fed to the automatic machine. The stock is normally stored in racks in such a manner that each individual bar may be longitudinally displaced to present a free end portion for the bevelling operation, the projecting length of stock being held stationary either by the weight of the stock above it or by other means, if required.

The present invention provides a power operated cutting tool which is supported on the projecting free end portion of the stock during the bevelling operation and which is axially displaceable thereon. The tool may also be rotated circumferentially of the stock so that all end edges can be bevelled without removing the tool from the stock.

For stock of circular cross-section, the tool is provided with two guide members having aligned circular apertures in which the free end portion of the stock is simultaneously received. The tool may then be moved freely on the stock, both axially and circumferentially, so that the circular end edge of the stock is bevelled throughout its entire circumference.

For square, hexagonal or other stock of parallel-sided polygonal cross-sectional configuration, the guide member which is nearer to the cutter has an aperture comprising a parallel-sided portion and an enlarged portion communicating with the parallel-sided portion. The tool is guided for lateral movement along a straight end edge of the polygonal end face by the parallel-sided portion of the aperture. By displacing the tool laterally so that the stock is received in the enlarged portion of the aperture, the tool may be rotated circumferentially around the stock for the bevelling of another straight end edge without removing the tool from the stock. The guide member which is remote from the cutter has a circular aperture of non-uniform diameter to permit lateral movement of the tool to guide the cutter along the straight end edge which is being bevelled.

The cutter may be conical in which case its rotational axis is parallel to the longitudinal axis of the work or the cutter may be cylindrical in which case its rotational axis is inclined with respect to the axis of the work-piece.

Figure 2:
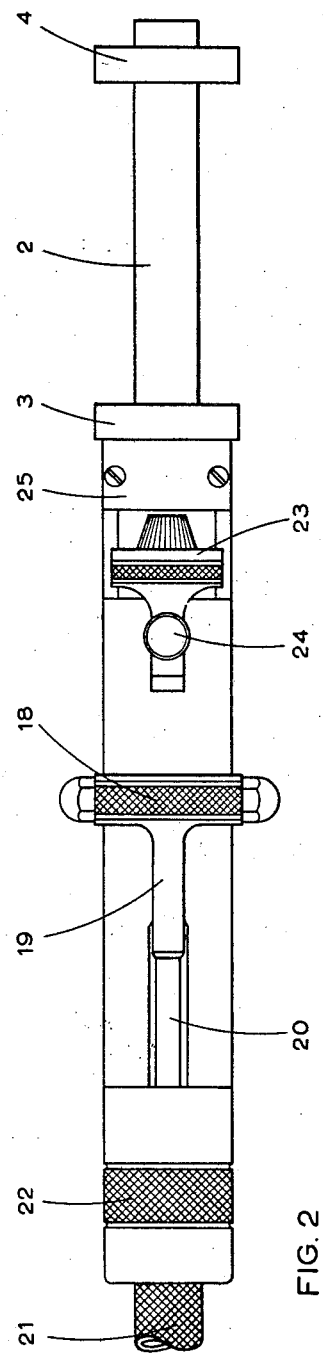
Figure 3:
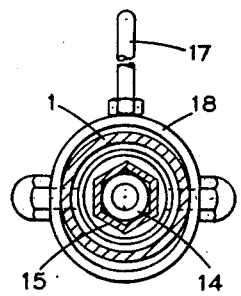
Figure 4:
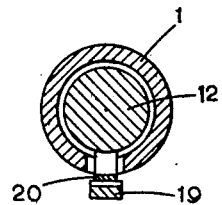
Figure 5:
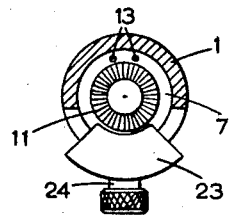
Figure 6:
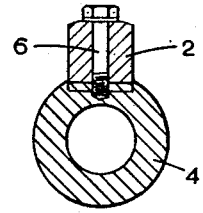
Figure 9:
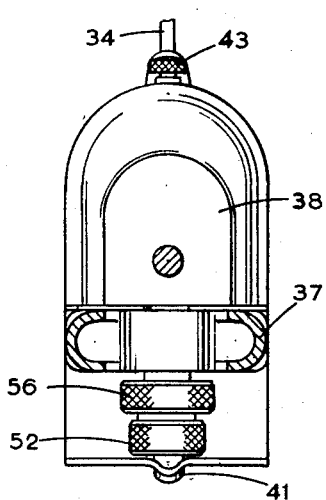
Figure 10:
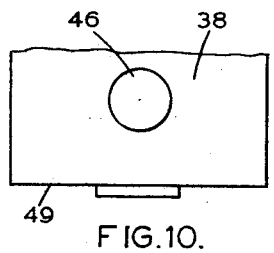
Figure 11:
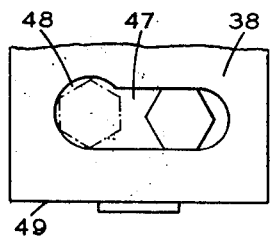

Now in order that the invention may be clearly understood and readily carried into effect embodiments of the tool are by way of example hereinafter more fully described with reference to the accompanying drawings in which:

FIG. 1 is a longitudinal section through one form of tool shown working on a tube shown in broken lines, FIG. 2 is a bottom plan view of the tool of FIG. 1, FIGS. 3 to 6 are cross sections on the line A—A, B—B, C—C and D—D respectively of FIG. 1, FIG. 7 is a longitudinal section through another form of tool shown working on a rod, FIG. 8 is a plan view looking down on FIG. 7, FIG. 9 is a cross section on the line III—III of FIG. 7 looking in the direction of the arrows, FIG. 10 is a view on a slightly larger scale looking on a guide member with a circular aperture, and FIG. 11 is a view similar to FIG. 10 showing a guide with a slot for use with multi-sided bar stock.

In the embodiment of tool illustrated in FIGS. 1–6, it has a frame or tubular body 1 having an end extension or supporting member 2 carrying two guide elements or rings 3, 4 which are longitudinally spaced along the extension 2. Each of the guide elements 3, 4 has a circular aperture formed therein, the two apertures being aligned on an axis parallel to the longitudinal axis of the body 1. The guide elements 3, 4 seat in slots which hold them against turning and are detachably secured as by cap screws 5, 6 which enable them to be interchangeable with other such elements having different diameters of aperture to adapt the tool to deal with different diameters of rods and tubes.

Within the body 1 is a sleeve member 7 which supports bearings 8, 9 for the shaft 10 of a conical shape cutter 11 with the axis of such shaft parallel to the longitudinal axis of the extension 2. This arrangement is such that axial thrust from the cutter 11 is not applied to the motor 12 which drives the cutter shaft 10.

The motor 12 which is housed in the body 1 is a compressed-air driven motor. The exhaust air from motor 1 is taken through bores 13 in the supporting member 7 to discharge at or around the cutter 11 for cooling purposes. The drive from the motor 12 is taken from a nut 14 on the shaft thereof through a coupling sleeve 15 to a similar nut 16 on the end of the cutter shaft 10.

The tool may be provided with a radially extending handle 17 to facilitate turning the tool on the work-piece during use and such handle is conveniently carried by a stirrup or ring 18 which is capable of limited circumferential movement with respect to the body 1 and has an extension 19 extending to the operating control 20 of the motor 12 such that on circumferential rotation of the ring 18 the motor control 20 is actuated for selectively starting or stopping the motor 12.

The air line 21 hose to the motor 12 is conveniently taken through a hollow extension 22 of the body 1 which has rounded edge or curved mouth substantially as illustrated.

An adjustable stop 23 is provided externally of the body 1 and held by a knurled bolt or locking screw 24 which engages the sleeve member 7. The arrangement is such that the rod or tube being operated upon can engage such stop 23 to limit the extent of cutting by the cutter 11 as will be appreciated from FIGURE 1.

A cover plate 25 is provided, which is removable to facilitate changing the cutter 11.

In the other embodiment of tool illustrated in FIGS. 7–11, it has a body 30 with a part 31 shaped to receive the end of an electric motor 32, which is secured by a holding pin or bolt 33, having an electric lead 34 and a stop/start button 35 and provided with a carbide or like hard cylindrical or parallel-sided cutter 36.

The body 30 forms a hollow portion in which the cutter 36 works and has an extension 37 integral therewith which carries the guide members 38, 39. Part of this hollow portion is closed off by a hinged door 40, normally held closed by a screw 41 but which may be opened to discharge chips, and is completed by a cover 42 held by a screw 43 to a part 44 attached to the body 30 and carrying a stop plate 45. The cover 42 has an open side which is closed off by a plate constituting the guide member 38 which is appropriately shaped for the purpose and apertured as hereinafter described.

The other guide member 39 is conveniently formed as a ring and always has a circular aperture therein the nearest edge portion of which, whatever its diameter, is always at a fixed distance from the extension 37. The guide member 38 either has a circular aperture 46 (FIG. 10) matching the diameter of the aperture in the guide 38 and axially aligned therewith for handling round section work pieces such as rods and tubes, or it has a parallel-sided slot 47 (FIG. 11) with an enlargement 48 at one end for handling rectangular, hexagonal or other polygonal bar stock with parallel sides. The guide member 38 like the guide 39, has the nearest edge portion of its circular aperture 46 or of its slot aperture 47 located at a predetermined distance from the extension 37, the edge 39 of the guide member 38 being adjacent to the extension 37. The guides 38 and 39 are interchangeable with other guides having larger or smaller apertures appropriate to the dimensions of the work pieces to be bevelled.

The chamfering of circular section work pieces is simply accomplished by a circumferential rotation of the tool around the stationary work-piece with the cutter 36 in operation until the end of the work piece abuts the stop 45 in all positions of rotation of the tool. In the case of angular section stock, the tool is moved so that the bar is received through the circular aperture in the guide 38 and the enlargement 48 of the aperture which communicates with the parallel-sided portion 47.

The tool may be displaced rotated circumferentially while the stock is in the enlargement 48 to select a desired straight end edge to be bevelled. The tool is then moved laterally so that the stock is guided within the parallel-edged portion 47 of the aperture.

As shown in FIG. 7, the aperture in the guide member 39 which is more remote from the cutter 36, comprises a portion of minimum diameter intermediate its ends which permits relative angular displacements between the central axis of the circular aperture and the longitudinal axis of the workpiece while holding the workpiece and the circular aperture against relative lateral displacements by guiding engagement between the workpiece and the internal edge of the minimum diameter portion of the aperture. During this time, the tool and the workpiece are held against relative rotational movement by guiding engagement between opposite sides of the workpiece and the parallel-sided portion 47 of the aperture.

The cutter thus moves along the straight end edge in an arcuate path lying in a plane parallel to the sides of portion 47 of the aperture. The center of the arcuate path is effectively but not necessarily precisely determined by the center of the minimum diameter portion of the circular aperture in guide member 39. The cutter 36 will thus move along the desired straight end edge of the polygonal workpiece. The arcuate shape of the cutter path will cause an insignificant increase in the extent of the bevel intermediate the ends of the cut.

The guide members 38, 39 are carried by stems 50, 51 which are threaded to mesh with lock nuts 52, 53 respectively which are rotatable relative to stem holders 54, 55. The holder 54 is externally threaded to engage in a threaded bore in the extension 37 so that such holder may be axially adjusted with respect to the extension 37 to alter the position of the guide member 38 and hence the position of its aperture to alter the extent of tapering or chamfering of the work piece. To facilitate rotation of the holder 50 to effect its axial adjustment, it is conveniently formed with a knurled head 56. The holder 55 is disposed in a plain bore in the extension 37 and is suitably locked therein. The guide members 38, 39 may be simply changed by slacking the lock nuts 52, 53, withdrawing their stems 50, 51, introducing the stems of equivalent guide members, with different size apertures appropriate to the dimensions of the work stock or with a round aperture for a slot aperture or vice versa in the case of the guide 38, and then re-tightening the locknuts.

The slot or elongated aperture of the guide 38 may be provided in an element which may be substituted for the guide ring 3 of the tool illustrated in FIGS. 1 and 2.

We claim:
1. A tool of the class described, comprising: a frame member; an elongated supporting member extending outwardly from said frame member; two guide members carried by longitudinally spaced portions of said supporting member, each of said guide members having an aperture formed therein, said apertures being arranged for the simultaneous reception of the free end portion of a stationary elongated workpiece, the terminal face of said end portion extending transversely thereof to define end edges to be beveled by said tool, said frame member being guided for axial displacement relative to said workpiece by engagement between said workpiece and the lateral edges of said apertures, said apertures being shaped to permit circumferential displacement of said tool around said workpiece; power operated cutter means carried by said frame member and engageable with said workpiece during said displacement of said frame member, said cutter means being shaped to bevel said end edges; and stop means carried by said frame member and engageable with the end of said workpiece for limiting axial displacement of said frame member to provide a predetermined maximum cut by said cutter means, said tool being freely manually positionable on and removable from said workpiece by an operator thereof, said tool being supported by said free end portion of said workpiece during cutting operation of said cutter means.

2. A tool according to claim 1, wherein said workpiece is of circular cross-sectional configuration and in which said apertures are circular, said tool being supported by said workpiece during cutting operation of said cutter means for free circumferential rotational movement around the periphery of said end portion of said workpiece along with said axial displacement thereof.

3. A tool according to claim 1, wherein said workpiece is of parallel-sided polygonal cross-sectional configuration and in which the one of said apertures nearer to said cutter means comprises a parallel-sided portion and an enlarged portion communicating with said parallel-sided portion, the other of said apertures which is more remote from said cutter means being of circular configuration and having a portion of minimum diameter intermediate its ends to permit relative angular displacements between the central axis of said circular aperture and the longitudinal axis of said workpiece while holding said workpiece and said circular aperture against relative lateral displacements by guiding engagement between said workpiece and the internal edge portion of said minimum diameter portion of said circular aperture with said tool and said workpiece held against relative rotational movement by guiding engagement between opposite sides of said workpiece and said parallel-sided portion of said nearer aperture to constrain said cutter means to move in a planar arcuate path parallel to the sides of said parallel-sided portion of said nearer aperture, the center of said arcuate path being effectively defined by the center of said minimum diameter portion of said circular aperture, whereby said cutter means is caused to cut a beveled cut along one of the straight end edges of said workpiece, said tool being rotatable around said workpiece to bring another straight end edge of said workpiece into engagement with said cutter means by displacement of said tool to cause said enlarged portion of said nearer aperture to receive said workpiece.

4. A tool according to claim 1, further comprising detachable fastening means securing said guide members to said supporting member to permit replacement of said guide members by other guide members the apertures whereof are dimensioned for engagement with another workpiece of cross-sectional dimensions which are different from those of said first-named workpiece.

5. A tool of the class described, comprising: a body portion, said body portion comprising an elongated extension thereof which projects generally outwardly beyond one end of said body portion; two guide members;

individual securing means detachably securing each of said guide members to said extension in longitudinally spaced relationship with respect thereto, each of guide members having an aperture formed therein, said apertures being adapted for simultaneous guiding engagement with the free end portion of an elongated stationary workpiece of uniform cross-section for free longitudinal displacement with respect thereto in a direction parallel to the longitudinal axis of said extension, said body portion being supported by said workpiece during the course of said displacement, the terminal face of said end portion of said workpiece extending transversely thereof to define end edges to be bevelled by said tool; power operated rotary cutter means carried by said body for cutting engagement with said end edges of said workpiece, said guide members permitting a bevelling of said end edges by circumferential displacement therealong accompanied by longitudinal displacement of said body portion.

6. A tool according to claim 5, wherein said body portion is cylindrical and in which said cutter means comprises a control member for starting and stopping the operation thereof, said tool further comprising handle means secured to said body portion for manipulation of said tool, said handle means being movable with respect to said tool, said handle means comprising a portion engageable with said control member by movement of said handle member for selectively starting and stopping operation of said cutter means.

7. A tool according to claim 5, wherein said cutter means comprises a cutter of conical configuration and in which the rotational axis of said cutter means is parallel to and spaced from the longitudinal axis of said extension.

8. A tool according to claim 5, in which said body portion is of cylindrical configuration and in which said cutter means comprises a motor portion secured to said body portion with the rotational axis of said cutter means coaxial with the longitudinal axis of said body portion, said motor portion comprising a control member which projects outwardly beyond said body portion, said tool further comprising an annular member encircling said body portion for limited circumferential displacement with respect thereto, said annular member comprising a portion engageable with said control member for selectively starting and stopping operation of said cutter means, said tool further comprising handle means for manipulation of said tool, said handle means being connected to said annular member.

9. A tool according to claim 8, in which the rotational axis of said cutter means is parallel to said extension and wherein said cutter means comprises a cutter of generally conical configuration, said guide members guiding said tool for axial displacement on said workpiece in a direction parallel to said rotational axis, said cutter means comprising coupling means intermediate said motor portion and said cutter for preventing the transmission of axially directed forces from said cutter to said motor portion.

10. A cutter according to claim 5, wherein said guide members guide said tool for axial displacement on said workpiece along an axis which intersects the rotational axis of said cutter means obliquely with respect thereto, said cutter means comprising a cutter member of generally cylindrical configuration.

References Cited in the file of this patent

UNITED STATES PATENTS

| | | |
|---|---|---|
| 282,515 | Hackstadt | Aug. 7, 1883 |
| 1,388,884 | Peck | Aug. 20, 1921 |
| 1,482,224 | Engman | Jan. 29, 1924 |
| 1,532,650 | Brewer | Apr. 7, 1925 |
| 1,993,064 | Le Blanc | Mar. 5, 1935 |
| 2,373,341 | Rowe | Apr. 10, 1945 |
| 2,393,463 | Gottlieb | Jan. 22, 1946 |
| 2,490,878 | Marsh | Dec. 13, 1949 |

FOREIGN PATENTS

| | | |
|---|---|---|
| 524,253 | Canada | Apr. 24, 1956 |